Feb. 7, 1950        A. TELLIER        2,496,827
EDUCATIONAL APPARATUS
Filed May 22, 1947        2 Sheets-Sheet 1
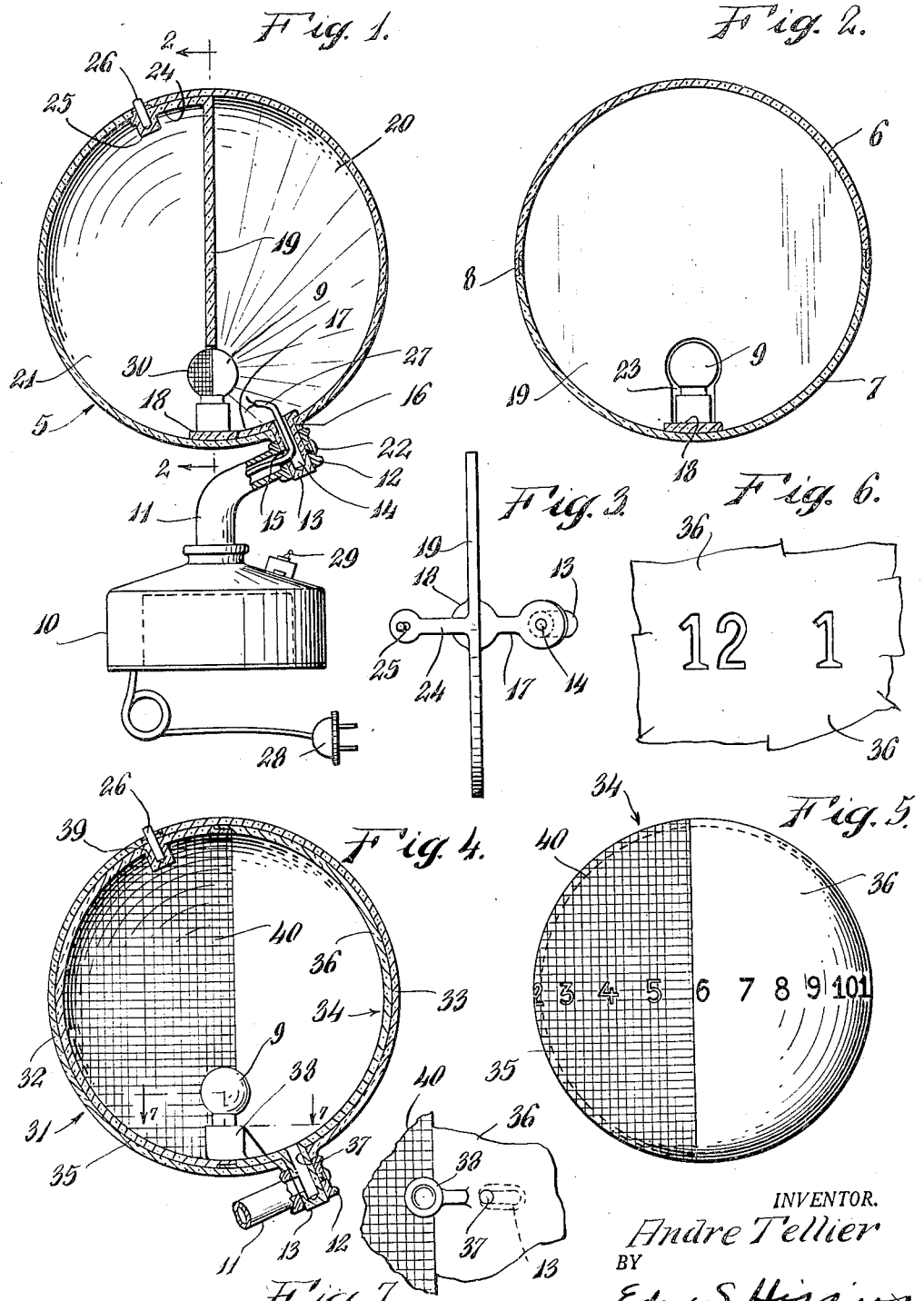
INVENTOR.
Andre Tellier
BY Edw. S. Higgins
ATTORNEY.

Feb. 7, 1950     A. TELLIER     2,496,827
EDUCATIONAL APPARATUS
Filed May 22, 1947     2 Sheets-Sheet 2

INVENTOR.
Andre Tellier
BY Edw. S. Higgins
ATTORNEY

Patented Feb. 7, 1950

2,496,827

UNITED STATES PATENT OFFICE 2,496,827

EDUCATIONAL APPARATUS

Andre Tellier, New York, N. Y.

Application May 22, 1947, Serial No. 749,663

1 Claim. (Cl. 35—46)

This invention relates generally to educational apparatus and more particularly to terrestrial globes in which a globe containing a map of the world has a light source therein for illuminating the surface of the globe.

A primary object of the present invention is to produce a new and improved terrestrial globe having means for indicating the area of the earth having day light and the area having night.

Another object is to provide a globe of this kind that may be readily removed from its support.

Another object is to provide such a globe with a light source having electrical connecting means extending into the globe at the pivotal axis thereof and arranged so that the globe light source and connecting means may be removed as a unit from the support or base.

Other objects and advantages of the invention will be apparent from the description thereof to follow taken in connection with the accompanying drawings in which—

Fig. 1 is a side elevation of a terrestrial globe embodying one form of my invention, parts being broken away to show the features of the invention.

Fig. 2 is a sectional view taken on the plane of the line 2—2 of Fig. 1.

Fig. 3 is an edge view of the globe dividing disc and its support.

Fig. 4 is a view similar to Fig. 1 showing a modified form of the invention.

Fig. 5 is a front view of the inner globe member of Fig. 4.

Fig. 6 is an enlarged detail view of a portion of the inner globe of Fig. 5.

Fig. 7 is a sectional view taken on the plane of the line 7—7 of Fig. 4.

Referring to Figs. 1 to 3, inclusive, the form of the invention herein shown comprises a globe consisting of a sphere 5 formed of glass, plastic or the like and made in two sections 6 and 7 fitting together with their edges in overlapping relationship as indicated at 8.

Figure 8:
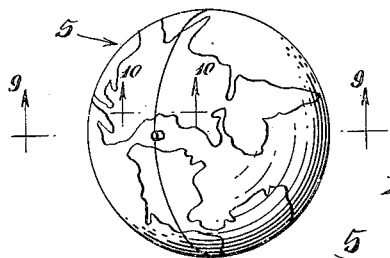
Fig. 8 is a top plan view of another modified form of the invention.

The outer surface of the globe 5 has a map applied thereon such as shown in Fig. 8. The map may be of paper or may be printed on the globe or otherwise suitably displayed in such manner that the light source, such as the lamp 9 inside the globe, will illuminate the outer surface thereof. The globe is mounted on a base 10, a goose-neck tubular bracket 11 being provided between the base and the globe to support the latter. The bracket has a flanged socket portion 12 at its outer end. Mounted in said socket portion is a bushing 13 having an axial bore 14 open at its top and with a side opening 15 communicating with the interior of the tubular bracket. Bushing 13 projects above the socket portion and through an opening 16 into the hollow globe 5. A web portion 17 connects the bushing with an integral base plate 18 inside the globe. A disc 19 is formed integrally with the base plate 18 and extends across the interior of the globe dividing said interior into two compartments 20 and 21 as seen in Fig. 1. The disc is formed of opaque material. A set screw 22 secures the bushing in position in the bracket.

The disc is provided at its bottom edge with a cut-out portion 23 and mounted on the circular plate 18 is the lamp 9, the lamp being positioned in the cut-out portion centrally of the disc as shown in Fig. 1. At its upper edge, the disc is provided with a lateral extension 24 having a socket portion 25 at its outer end, for receiving a pivot pin 26 extending through an opening in the globe 5. The pin 26 and the bushing 13 form the axis of the globe, the pin forming the North Pole and the bushing the South Pole.

Conductor wires 27 pass through the base 10 and into the passage in the bracket 11, through the opening 15 into the bushing 13 and to the inside of the globe where they are operatively connected to the lamp 9, the wires being shown detached from the lamp in Fig. 1 for the sake of clearness. The outer ends of the conductors are attached to a plug 28 for connecting them to a source of electromotive force such as the house supply. A switch 29 may be provided on the base for turning the lamp on and off. It will be noted that the lamp 9 has one side thereof colored, such as blue as indicated at 30, while the opposite side of the bulb is uncolored. The lamp bulb is positioned so that the disc cuts it in two whereby when the lamp is lit the colored or blue rays will shine on one side of the disc into the compartment 21 as seen in Fig. 1 to indicate night, while the bright rays shine on the opposite side of the disc into the compartment 20 to indicate day time.

It will be seen that the lamp support and disc are integral with the bushing and fixed and that the globe 5 rotates on the bushing relative to the disc and lamp. The globe may thus be rotated manually to show various parts of the earth shown on the map lit up to indicate day time and other parts darkened to indicate night time, as will be understood.

In the form of the invention shown in Figs. 4 to 7, inclusive, the globe 31 comprises an outer spherical member formed of two sections 32 and 33 and an inner spherical member 34 formed of two sections 35 and 36. In this form the lower bushing 37 is formed integrally with section 36 of the inner spherical member 34, and the socket 38 for the lamp 9 is also formed integrally with the section 36. The pin 26 seats in a socket portion 39 formed integrally with the section 35 of the inner spherical member. Half of the surface of the inner spherical member 34 is colored, such as blue, as indicated at 40, and the other half is clear. On the outer surface of said member 34 and horizontally disposed thereon are spaced numerals from 1 to 12 as seen in Figs. 5 and 6 indicating the hours of the day. The numbers on the colored half may be cut out and the numbers on the clear half may be printed thereon. The globe is illuminated by the lamp 9 as in the form of Figs. 1 to 3, inclusive, and the outer sphere 35 is rotated around the inner sphere 34 to indicate day time and night time at various points on the map as in the form of Fig. 1.

Figure 9:
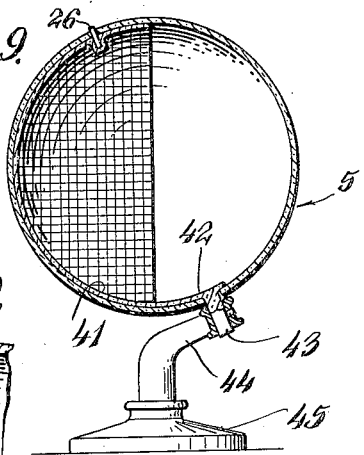
Fig. 9 is a sectional view taken on the plane of the line 9—9 of Fig. 8.
Figure 10:
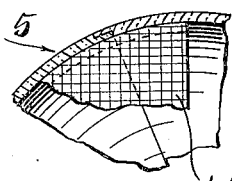
Fig. 10 is a sectional view taken on the plane of the line 10—10 of Fig. 8.
Figure 11:
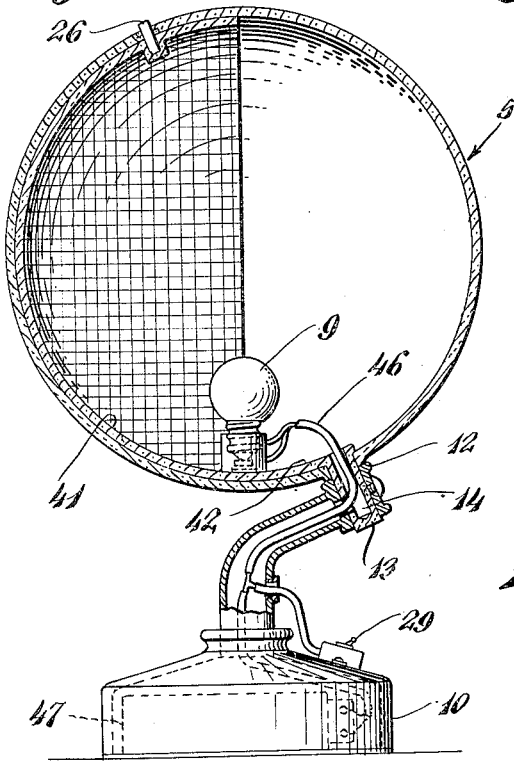
Fig. 11 is a part sectional and part side elevational view of still another modified form of the invention.
Figure 12:
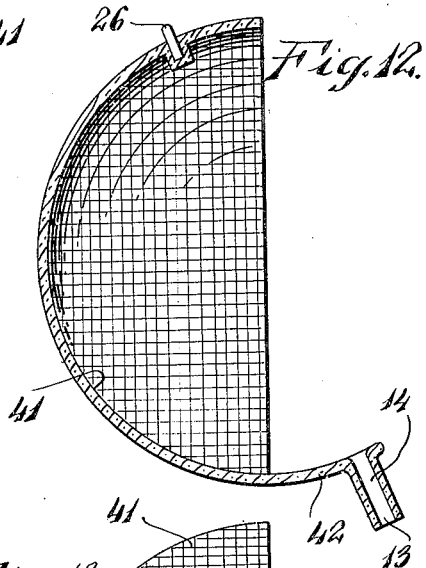
Fig. 12 is a plan view of the semi-spherical member of Fig. 11 for shading the light.
Figure 13:
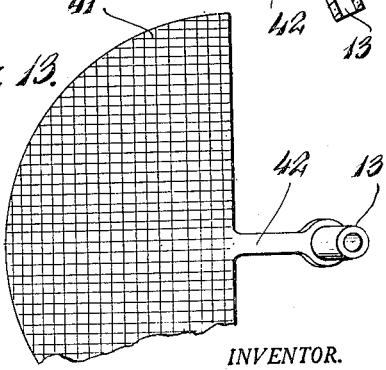
Fig. 13 is a fragmentary bottom plan view of the device of Fig. 12.
Figure 14:
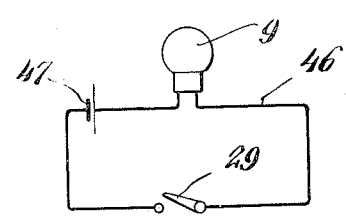
Fig. 14 is a diagrammatic view showing the electrical circuit used for the device of Fig. 11.

In Figs. 8 to 10, inclusive, is illustrated another modified form of the invention in which the inner semi-spherical member 41 is provided with an extension 42 carrying a plug 43 extending into the socket 12 of the bracket 44 supported on a base 45. In this form, the inner semi-spherical member 41 is colored, such as blue, and the rotatable globe 5 is illuminated by placing it in front of a light source such as a lamp.

In the form of the invention shown in Figs. 11 to 14, inclusive, the globe comprises an outer sphere 5 and an inner semi-spherical member 41 as in Figs. 8 to 10, inclusive, but the globe is illuminated by means of the lamp 9 connected by wires 46 to a battery 47 in the base 10.

Changes in details of construction might be resorted to without departing from the principle of the invention and I desire to be limited only by the state of the prior art and the appended claim.

I claim:

A globe comprising a base, a tubular bracket on said base having a socket portion at one end thereof, a rotatable spherical member having opposed openings in its polar regions, a disc member disposed centrally inside said spherical member separating the interior thereof into two compartments, said disc member having a cut-out portion at its bottom edge, said disc member being formed of opaque material, a plate formed integrally with said disc member at its bottom edge, a curved extension formed integrally with said plate and a radially disposed integral bushing member on said extension projecting through one of the openings in said spherical member, a curved extension formed integrally with said disc member at the upper edge thereof, an integral socket portion on said latter extension, a pin seated in said latter socket portion extending through the other opening in said spherical member, said pin and bushing member forming the axis of rotation of said spherical member, means for fastening the bushing member to the bracket, a lamp on the plate of the disc member and disposed in said cut-out portion centrally of the body of said disc member, one-half the surface of said lamp being colored blue and extending into one compartment of the spherical member and the other half being clear and extending into the other compartment and conductors passing through the base, the tubular bracket and the bushing member to the interior of the spherical member and having one end operatively connected to the lamp and the other end being adapted to be operatively connected to a source of electromotive force for lighting the interior of the spherical member whereby one-half thereof will be lit and the other half dark to indicate day time and night time, respectively.

ANDRE TELLIER.

REFERENCES CITED

The following references are of record in the file of this patent:

UNITED STATES PATENTS

| Number | Name | Date |
|---|---|---|
| 1,515,135 | Alexander | Nov. 11, 1924 |
| 2,068,418 | Kyack | Jan. 19, 1937 |
| 2,200,821 | Colberg | May 14, 1940 |